United States Patent
Ho et al.

(10) Patent No.: US 10,044,411 B2
(45) Date of Patent: Aug. 7, 2018

(54) DATA READING DEVICE AND METHOD THEREOF, AND DATA TRANSMISSION DEVICE AND METHOD THEREOF

(71) Applicant: MStar Semiconductor, Inc., Hsinchu Hsien (TW)

(72) Inventors: Kai-Ting Ho, Zhubei (TW); Guo-Kiang Hung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 134 days.

(21) Appl. No.: 14/603,465

(22) Filed: Jan. 23, 2015

(65) Prior Publication Data

US 2015/0215002 A1    Jul. 30, 2015

(30) Foreign Application Priority Data

Jan. 24, 2014   (TW) .............................. 103102662 A (51) Int. Cl.
| G06K 19/06 | (2006.01) |
| H04B 5/00 | (2006.01) |
| G06F 3/044 | (2006.01) |
| G06F 3/041 | (2006.01) |
| G06K 7/00 | (2006.01) |

(52) U.S. Cl.
CPC ........... *H04B 5/0012* (2013.01); *G06F 3/044* (2013.01); *G06F 3/0416* (2013.01); *G06K 7/0008* (2013.01)

(58) Field of Classification Search
CPC ...... G06K 7/081; G06K 7/0008; G06F 3/044; H01Q 1/2225
USPC ......... 235/380, 449, 451; 340/10.1; 345/174
See application file for complete search history.

(56) References Cited

U.S. PATENT DOCUMENTS

| 4,876,535 A | * | 10/1989 | Ballmer | ................. G06K 7/081 235/380 |
| 6,173,899 B1 | * | 1/2001 | Rozin | ................. G06K 7/0008 235/449 |
| 2013/0257785 A1 | * | 10/2013 | Brown | ................... G06F 3/044 345/174 |

(Continued)

FOREIGN PATENT DOCUMENTS

TW           201214359 A1       4/2012

OTHER PUBLICATIONS

TIPO Office Action, dated Jun. 13, 2016, 6 pages.

*Primary Examiner* — Abdul-Samad A Adediran
(74) *Attorney, Agent, or Firm* — Edell, Shapiro & Finnan, LLC (57) ABSTRACT

A data reading device that transmits power to a data transmission device and reads data transmitted from the data transmission device is provided. The data reading device includes: a first electrode, forming a first coupling capacitance with the data transmission device; a second electrode, forming a second coupling capacitance with the data transmission device; a control circuit, coupled to the first electrode and the second electrode, configured to provide the first electrode with a first reference voltage and the second electrode with a second reference voltage to cause a voltage difference between the first electrode and the second electrode to vary with time, and to detect charge changes of the first coupling capacitance and the second capacitor; and a determination unit, coupled to the control circuit, configured to determine the data according to the charge changes.

11 Claims, 9 Drawing Sheets

(56) References Cited

U.S. PATENT DOCUMENTS

2013/0271265 A1* 10/2013 Finn .................... H01Q 1/2225
340/10.1
2014/0217176 A1* 8/2014 Baldischweiler ....... G06F 3/044
235/451

* cited by examiner

DATA READING DEVICE AND METHOD THEREOF, AND DATA TRANSMISSION DEVICE AND METHOD THEREOF

This application claims the benefit of Taiwan application Serial No. 103102662, filed Jan. 24, 2014, the subject matter of which is incorporated herein by reference.

BACKGROUND OF THE INVENTION

Field of the Invention

The invention relates in general to a data reading device and a method thereof as well as a data transmission device and a method thereof, and more particularly, to a data reading device and a method thereof as well as a data transmission device and a method thereof adapted to read and transmit data through capacitance coupling.

Description of the Related Art

Touch devices have become prevalent nowadays. One implementation of the touch function is capacitive touch control. The capacitive touch control features fast and sensitive response as well as multi-touch, and is adopted to realize capacitive touch panels by most commercial mobile devices such as tablet computers and cell phones. With the prevalence of capacitive touch panels, devices adopting capacitive touch panels may become even more popular if new applications such as data transmission can be developed for capacitive touch panels.

SUMMARY OF THE INVENTION

The invention is directed to a data reading device and a method thereof as well as a data transmission device and a method thereof adapted to read and transmit data through capacitance coupling.

The present invention discloses a data reading device configured to transmit power to a data transmission device and read data transmitted from the data transmission device through capacitance coupling. The data reading device includes: a first electrode, forming a first coupling capacitance with the data transmission device; a second electrode, forming a second coupling capacitance with the data transmission device; a control circuit, coupled to the first electrode and the second electrode, configured to provide the first electrode with a first reference voltage and the second electrode with a second reference voltage to cause a voltage difference between the first electrode and the second electrode to vary with time, and to detect charge changes of the first coupling capacitance and the second capacitor; and a determination unit, coupled to the control circuit, configured to determine the data according to the charge changes.

The present invention further discloses a capacitive touch device configured to transmit power to a data transmission device and read data transmitted from the data transmission device through capacitance coupling. The capacitive touch device includes: a plurality of detection units; a control circuit, coupled to the detection units, configured to provide a first part of the detection units with a first reference voltage and a second part of the detection units with a second reference voltage to cause a voltage difference between the first reference voltage and the second reference voltage to vary with time, and to detect charge changes of the first part of the detection units and the second part of the detection units; and a determination unit, coupled to the control unit, configured to determine the data according to the charge changes.

The present invention further discloses a data transmission device adapted to receive power from a data reading device and transmit data to the data reading device. The data transmission device includes: a first electrode, forming a first coupling capacitance with the data reading device; a second electrode, forming a second coupling capacitance with the data reading device; a rectifier, coupled to the first electrode and the second electrode, configured to generate a voltage according to a voltage difference between the first electrode and the second electrode; a switch element, coupled between the first electrode and the second electrode; and a control unit, coupled to the rectifier and the switch element, configured to receive the voltage and to control an on/off status of the switch element to change charges of the first electrode and the second electrode. The data reading device receives the data through detecting changes in the charges.

The present invention further discloses a capacitive touch device adapted to transmit data to a data reading device. The capacitive touch device includes: a plurality of detection units; a control circuit, coupled to the detection units, configured to cause potentials of a first part of the detection units and a second part of the detection units to change in a predetermined period according to the data to change charges of the first part of the detection units and the second part of the detection units. The data reading device receives the data through detecting the charge changes.

The present invention further discloses a data reading method adapted to transmit power to a data transmission device and read data transmitted from the data transmission device. The data reading method includes: providing a first electrode, the first electrode forming a first coupling capacitance with the data transmission device; providing a second electrode, the second electrode forming a second coupling capacitance with the data transmission device; providing the first electrode with a first reference voltage; providing the second electrode with a second reference voltage; causing a voltage difference between the first electrode and the second electrode to vary with time; detecting charge changes of the first coupling capacitance and the second coupling capacitance; and generating a data reading result according to the charge changes.

The present invention further discloses a data transmission method adapted to receive power from a data reading device and transmit data to the data reading device. The data transmission method includes: providing a first electrode, the first electrode forming a first coupling capacitance with the data reading device; providing a second electrode, the second electrode forming a second coupling capacitance with the data reading device; and causing potentials of the first electrode and the second electrode to change in a predetermined period according to the data to change charges of the first electrode and the second electrode. The data reading device receives the data through detecting changes in the charges.

The data reading device and the method thereof as well as the data transmission device and the method thereof are adapted to transmit and receive data through capacitance coupling. In addition to being directly applied to current common capacitive touch panels to provide devices adopting the capacitive touch panels with short-distance data transmission and reception functions, the present invention may further be extensively applied to data carriers without active power sources, e.g., smart cards, ATM cards and credit cards, and data readers without touch panels.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a data reading device and a method thereof as well as a data transmission device and a method thereof adapted to transmit and receive data through capacitance coupling. In possible implementation, one skilled person in the art may choose equivalent elements or steps to implement the disclosure based on the disclosure of the application. That is, the implementation of the disclosure is not limited in the embodiments disclosed in the disclosure. Further, a part of the elements included in the data reading device and the data transmission device of the disclosure are individually known elements. Without affecting the full disclosure and possible implementation of the device, details of the known elements are omitted. Further, the data reading method and the data transmission method may be implemented by the data reading device and the data transmission device of the disclosure or an equivalent device. Without affecting the full disclosure and possible implementation of the method of the disclosure, the description of the method focuses on the steps of the method instead of hardware.

Figure 1:
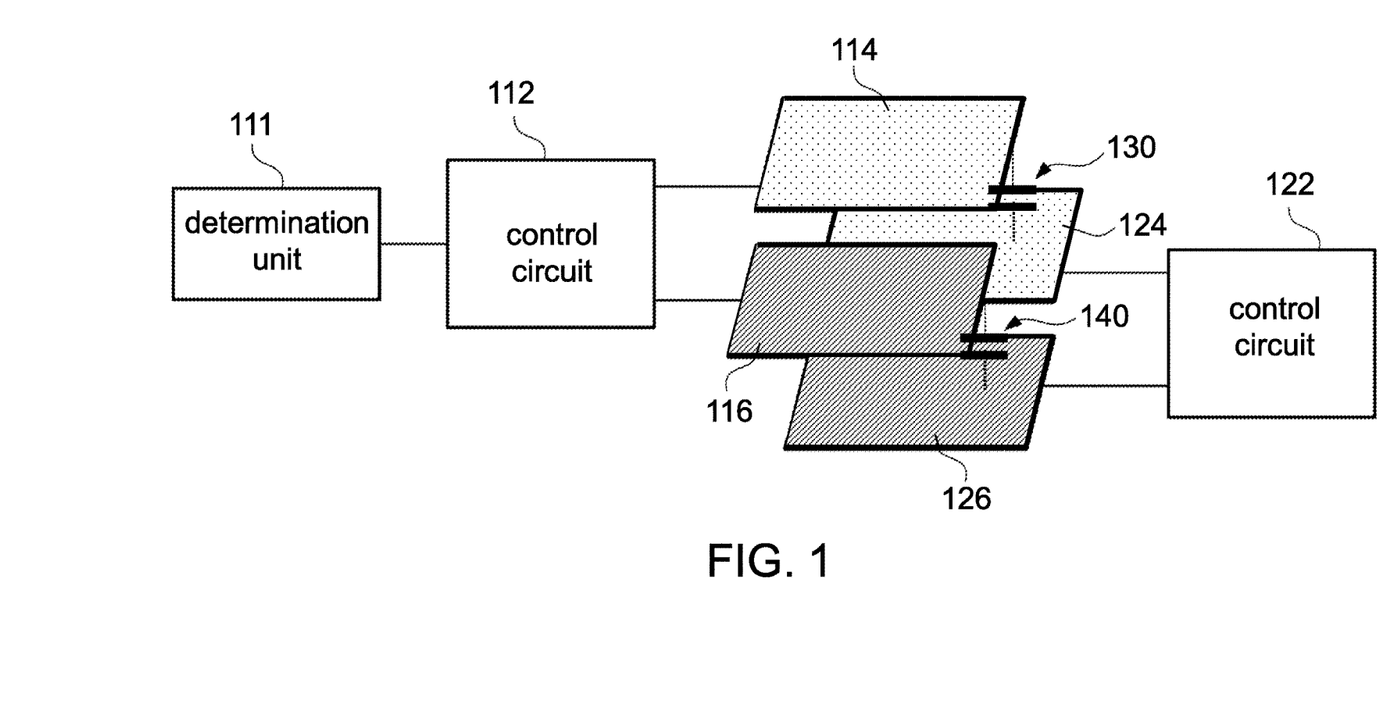
FIG. 1 is a schematic diagram of a data reading device and a data transmission device that transmit data and power through capacitance coupling of the present invention.

FIG. 1 shows a schematic diagram of a data reading device and a data transmission device adapted to transmit data and power through capacitance coupling of the present invention. The data reading device includes a determination unit 111, a control circuit 112, an electrode 114 and an electrode 116. The data transmission device includes a control circuit 122, an electrode 124 and an electrode 126. The electrode 114 and the electrode 124 are in a parallel or substantially parallel arrangement, with a coupling capacitance 130 forming between the two. Similarly, the electrodes 116 and 126 are in a parallel or substantially parallel arrangement, with a coupling capacitance 140 forming between the two. The data reading device and the data transmission device transmit power and data through the coupling capacitance 130 and the coupling capacitance 140. The control circuit 112 of the data reading device is coupled to the electrode 114 and the electrode 116, and provides the electrode 114 and the electrode 116 with different voltages. For example, the control circuit 112 provides the electrode 114 with a voltage $V_{ref1}$ and the electrode 116 with a voltage $V_{ref2}$ to cause a voltage difference between the electrode 114 and the electrode 116. This voltage different promotes charging of the coupling capacitance 130 and the coupling capacitance 140, i.e., charges are accumulated on the electrode 114, the electrode 116, the electrode 124 and the electrode 126. Associated details are given shortly. The control circuit 122 of the data transmission device, by controlling the voltages of the electrode 124 and the electrode 126 and collaborating with the electrode 114 and the electrode 116 having different voltages, adjusts the amounts of charges accumulated at the coupling capacitance 130 and the coupling capacitance 140. From the perspective of the control circuit 112 of the data reading device, different charges are obtained although the same voltage difference provided to the electrode 114 and the electrode 116, which means that capacitance values of equivalent capacitances formed by the coupling capacitance 130 and the coupling capacitance 140 are changed. Thus, the control circuit 112 of the data reading device may obtain data that the data transmission device wishes to transmit through detecting changes in the capacitance values (i.e., detecting changes in the charges). The determination unit 111 of the data reading device is coupled to the control circuit 112, and determines the data transmitted from the data transmission device according to the charge changes detected by the control unit 112.

Figure 2:
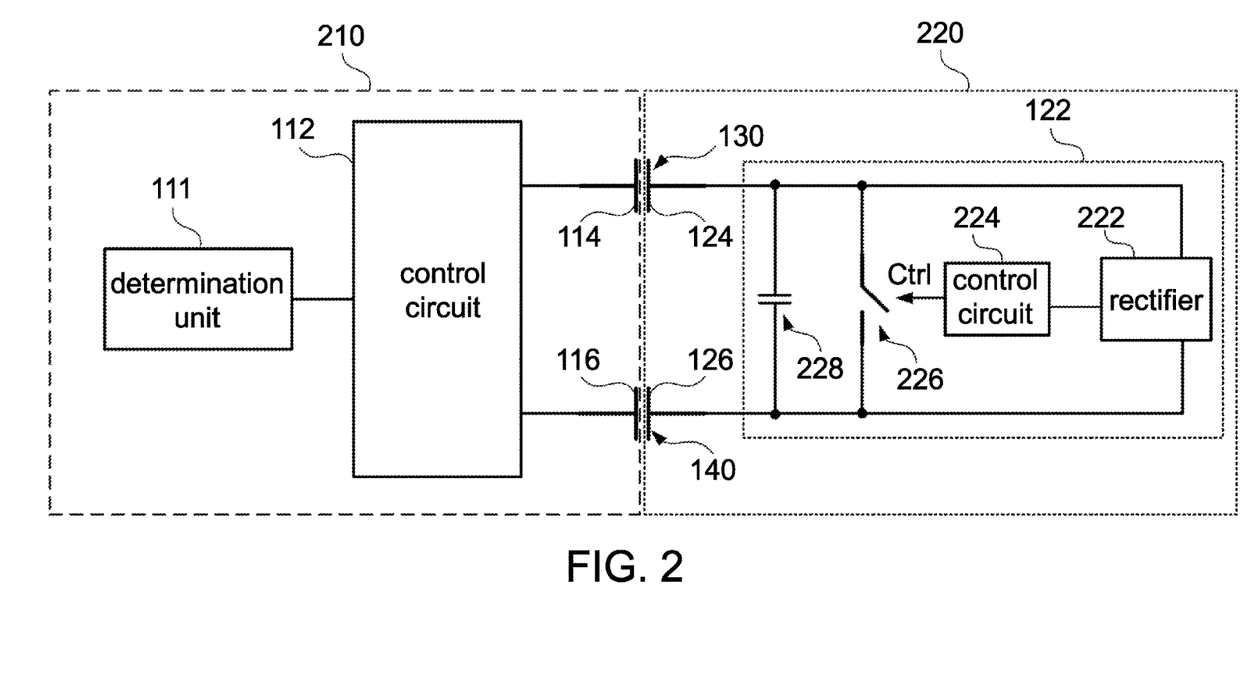
FIG. 2 is a circuit diagram of a data reading device and a data transmission device that transmit data and power through capacitance coupling of the present invention.
Figure 3:
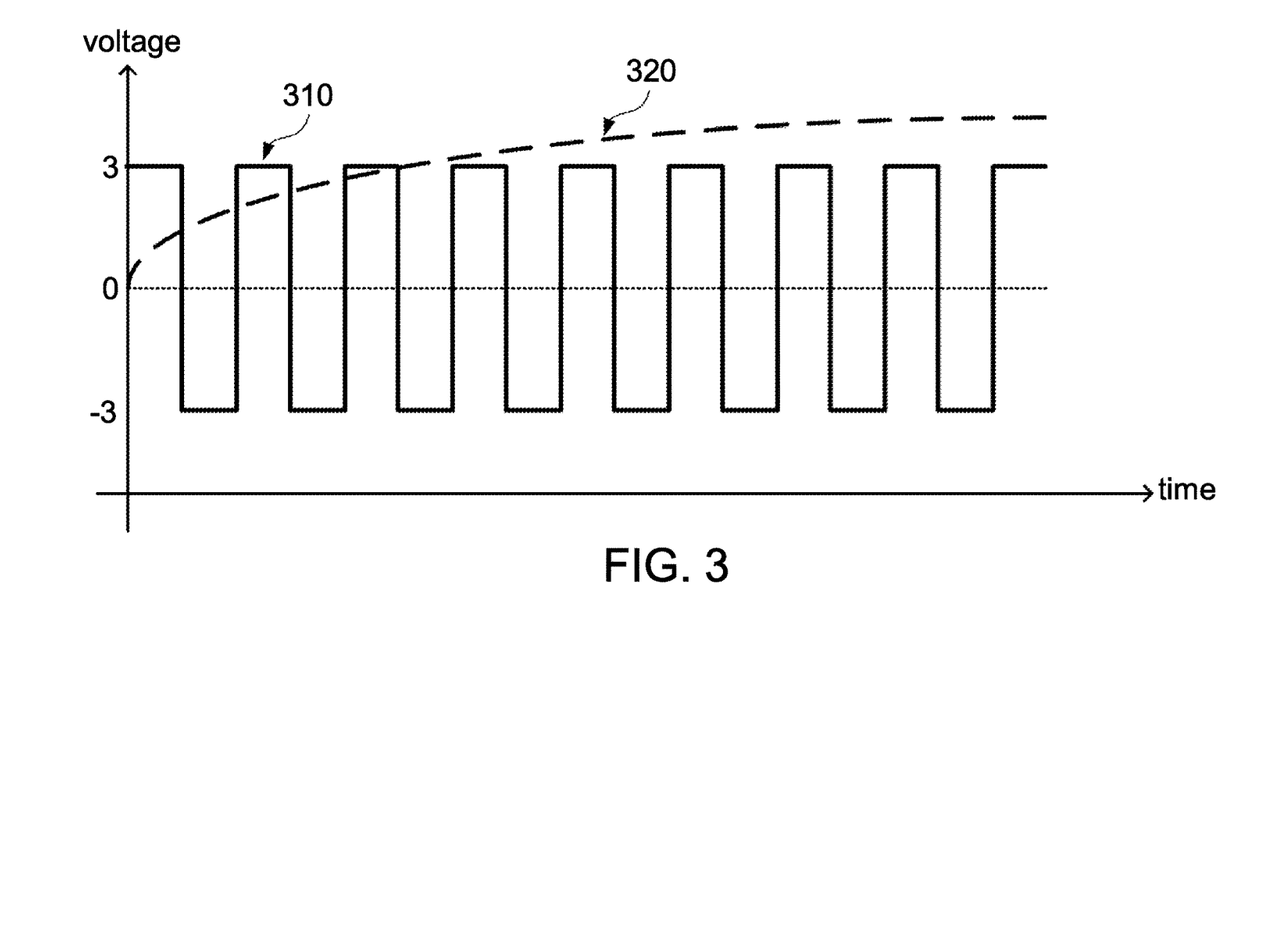
FIG. 3 is a relationship diagram of a voltage difference of electrodes of a data reading device and an output voltage of a rectifier of a data transmission device versus time of the present invention.

FIG. 2 shows a circuit diagram of a data reading device and a data transmission device adapted to transmit data and power through capacitance coupling of the present invention. The control circuit 112 of a data reading device 210 forms a voltage difference between the electrode 114 and the electrode 116, and the voltage difference is transmitted to a data transmission device 220 through capacitance coupling. Further, this voltage difference periodically varies with time. In one embodiment, the control circuit 112 provides the electrode 114 with a voltage signal having a voltage that changes periodically between 0V and 3V, and fixes the electrode 116 at 0V (grounded), thus obtaining a 3V voltage difference. In another embodiment, the control circuit 112 provides the electrode 116 with an inverted signal of a voltage signal provided to the electrode 114, thus obtaining a 6V voltage difference. A rectifier 222 of the data transmission device 220 rectifies the voltage difference signal to obtain a direct current (DC) signal. FIG. 3 shows a diagram of a voltage difference of electrodes of a data reading device and an output voltage from a rectifier of a data transmission device versus time. In the embodiment, both of the electrode 114 and the electrode 116 obtain voltage signals, which have voltages periodically changing between 0V and 3V and are however in opposite phases. A square wave 310 represents the voltage difference between the electrode 114 and the electrode 116, and a curve 320 is the output voltage of the rectifier 222. The output voltage of the rectifier 222 slowly increases to reach a sufficient voltage level, and a control unit 224 coupled to the rectifier 222 may then start to operate with the voltage. Principles of the rectifier 222 are generally known to one person skilled in the art, and shall be omitted herein.

Again referring to FIG. 2, the control circuit 122 of the data transmission device 220 further includes a switch element 226 coupled to the control unit 224. The control unit 224 controls a turn-on time point and a turn-on period of the switch element 226 according to data to be transmitted. The control circuit 122 further includes a capacitor 228 coupled between the electrode 124 and the electrode 126. A capacitance value of the capacitor 228 is designed to be smaller than capacitance values of the coupling capacitance 130 and the coupling capacitance 140. In one preferred embodiment, the capacitance values of the coupling capacitance 130 and the coupling capacitance 140 are about 20 pF, and the capacitance value of the capacitor 228 is about 1 pF or smaller. The capacitor 228 may be an additional capacitor element, or may directly be parasitic capacitance between the electrode 124 and the electrode 126. When the switch element 226 is turned off, the control circuit 112 of the data reading device 210 faces a circuit similar to the coupling capacitance 130, the capacitor 228 and the coupling capacitance 140 connected in series. As the capacitance value of the capacitor 228 is much smaller than the capacitance values of the coupling capacitance 130 and the coupling capacitance 140, an equivalent capacitance value of the three connected in series is substantially the capacitance value of the capacitor 228. On the other hand, when the switch element 226 is turned on, the control circuit 112 of the data reading device 210 equivalently faces a circuit of only the coupling capacitance 130 and the coupling capacitance 140 connected in series, and an equivalent capacitance value of such circuit is much greater compared to the equivalent capacitance value of the above circuit of the three connected in series. That is to say, whether the switch element 226 is turned on greatly affects the capacitance value of the equivalent capacitance connected to the control circuit 112. Thus, the change in the capacitance value only needs to be in a picofarad (pF) level in order to be detected by the control circuit 112.

Figure 4:
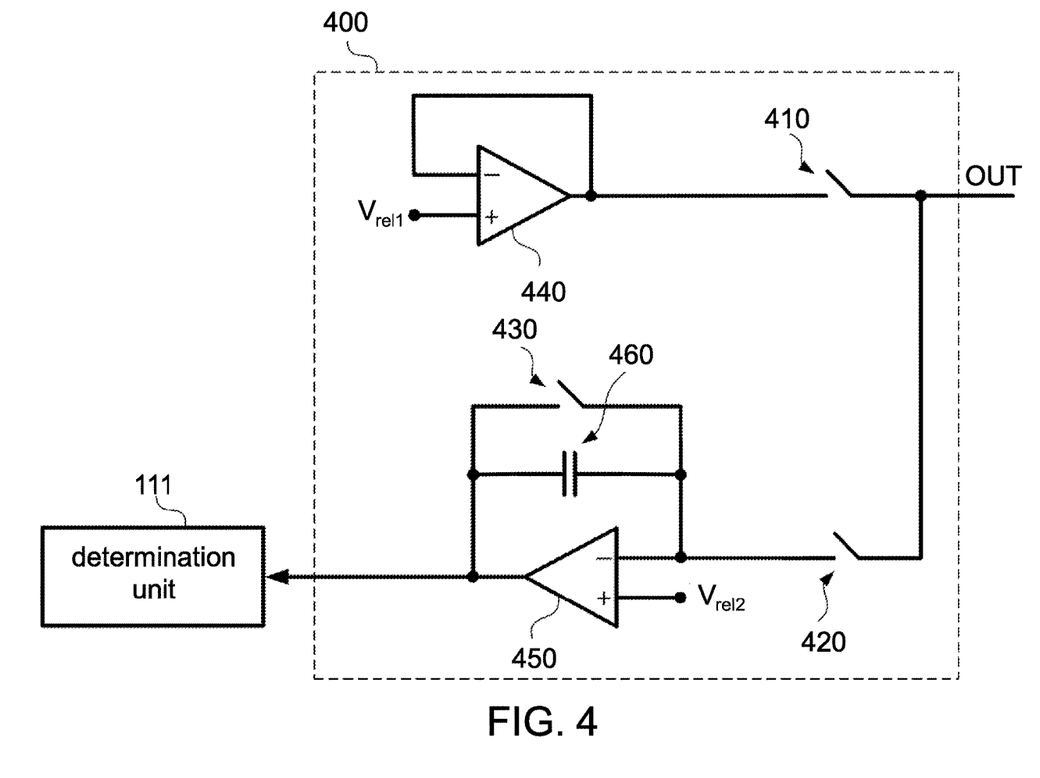
FIG. 4 is a schematic diagram of a control circuit of a data reading device according to an embodiment of the present invention.

As previously stated, the control circuit 112 provides the electrode 114 and the electrode 116 with a voltage difference, which is equivalently applying a voltage difference to two ends of the above equivalent capacitance. Given that the voltage difference stays unchanged, the change in the equivalence capacitance value causes a change in the total charge stored in the equivalent capacitor. The control circuit 112 receives the data transmitted from the data transmission device 220 through detecting the change in the charges (i.e., the change in the capacitance value). FIG. 4 shows a circuit diagram of a control circuit of a data reading device according to an embodiment of the present invention. A control unit 400 includes a switch element 410, a switch element 420, a switch element 430, an operational amplifier 440, an operational amplifier 450, and a capacitor 460. In one preferred embodiment, the control circuit 112 grounds one of the electrode 114 and the electrode 116, and utilizes a control unit 400 to control the voltage of the other electrode, such that the voltage difference between the two electrodes generates a periodic change. In another preferred embodiment, the control circuit 112 utilizes two control units 400 to respectively control the voltages of the electrode 114 and the electrode 116, and the two control units 400 are both coupled to a determination unit 111. The operational amplifier 440 serves as a voltage follower for providing its output end with a stable voltage $V_{refl}$. The switch element 410, the switch element 420 and the switch element 430 are periodically turned on. For example, during a period in which the control circuit 112 provides the equivalent capacitor with the first voltage difference (or referred to as a pre-charge stage), the switch element 410 and the switch element 430 are turned on, whereas the switch element 420 is turned off. At this point, the output end OUT outputs the voltage $V_{refl}$ and the capacitor 460 is discharged. During a period in which the control circuit 112 provides the equivalent capacitor with the second voltage difference (or referred to as a detection stage), the switch element 410 and the switch element 430 are turned off, whereas the switch element 420 is turned on. At this point, the equivalent capacitor is equivalently connected in series with the capacitor 460 via the output end OUT of the control unit 400, leading to a redistribution of the charges in the equivalent capacitor. The amount of charges of the equivalent capacitor affects the voltage at the output end of the operational amplifier 450. According to a change in the voltage (i.e., the change in the amount of charges of the equivalent capacitor), the determination unit 111 may determine the data transmitted from the data transmission device 220.

Figure 5:
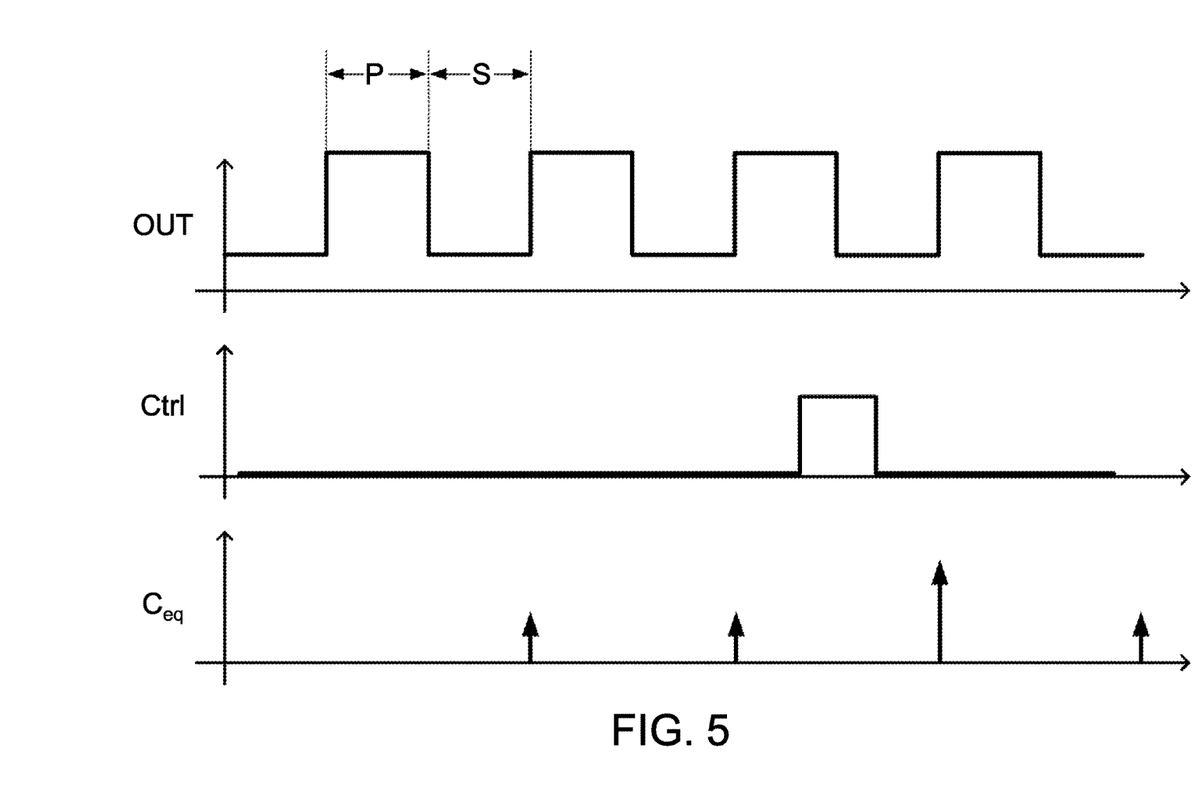
FIG. 5 is a relationship diagram of signals at a data receiving end and a data transmitting end of the present invention.

FIG. 5 shows a diagram of signals of a data receiving end and a data transmitting end of the present invention. The voltage signal at the output end OUT of the control unit 400 is as shown by a waveform at the top of FIG. 5, and displays a periodic pattern. In this example, a high level represents a pre-charge stage P, and a low level represents a detection stage S. Alternatively, the pre-charge stage P may be represented by a low level, and the detection stage S may be represented by a high level. The control signal Ctrl of the switch element 226 in FIG. 2 is as shown by a waveform in the middle of FIG. 5. When the control signal Ctrl of the switch element 226 is in a high level, it means that the switch element 226 is turned on. It is to be noted that, in the diagram, the turn on time points and lengths are merely illustrative. Although the data reading device may have a preferred reception effect when turned on in a conversion period between the pre-charge phase P and the detection phase S, the data reading device may also be turned on during the pre-charge phase P or the detection phase S. Preferably, the turn on frequency is smaller than or equal to the frequency of the voltage signal at the output end OUT. An equivalent capacitance value $C_{eq}$ detected by the data reading device is as shown by a pulse waveform at the bottom of FIG. 5. When the detection stage S ends, the data reading device may detect the equivalent capacitance value $C_{eq}$. As shown, when the switch element 226 is turned on, the data reading device may detect a greater equivalent capacitance value $C_{eq}$, and the determination unit 111 of the data reading device may determine the data that the data transmission device wishes to transmit according to the change. For example, the data reading device and the data transmission device may stipulate that the data represents a logic signal 1 when the equivalent capacitance value $C_{eq}$ is greater than a predetermined threshold for over a predetermined period, and the data represents a logic signal 0 when the equivalent capacitance value $C_{eq}$ is greater than a predetermined threshold for less than the predetermined period. In one preferred embodiment, the determination unit may first convert the voltage signal of the control unit 400 to a digital form by an analog-to-digital converter (ADC), and then parse and retrieve the datas by predetermined algorithm and signal protocol to further obtain the data transmitted from the data transmission device.

Figure 6:
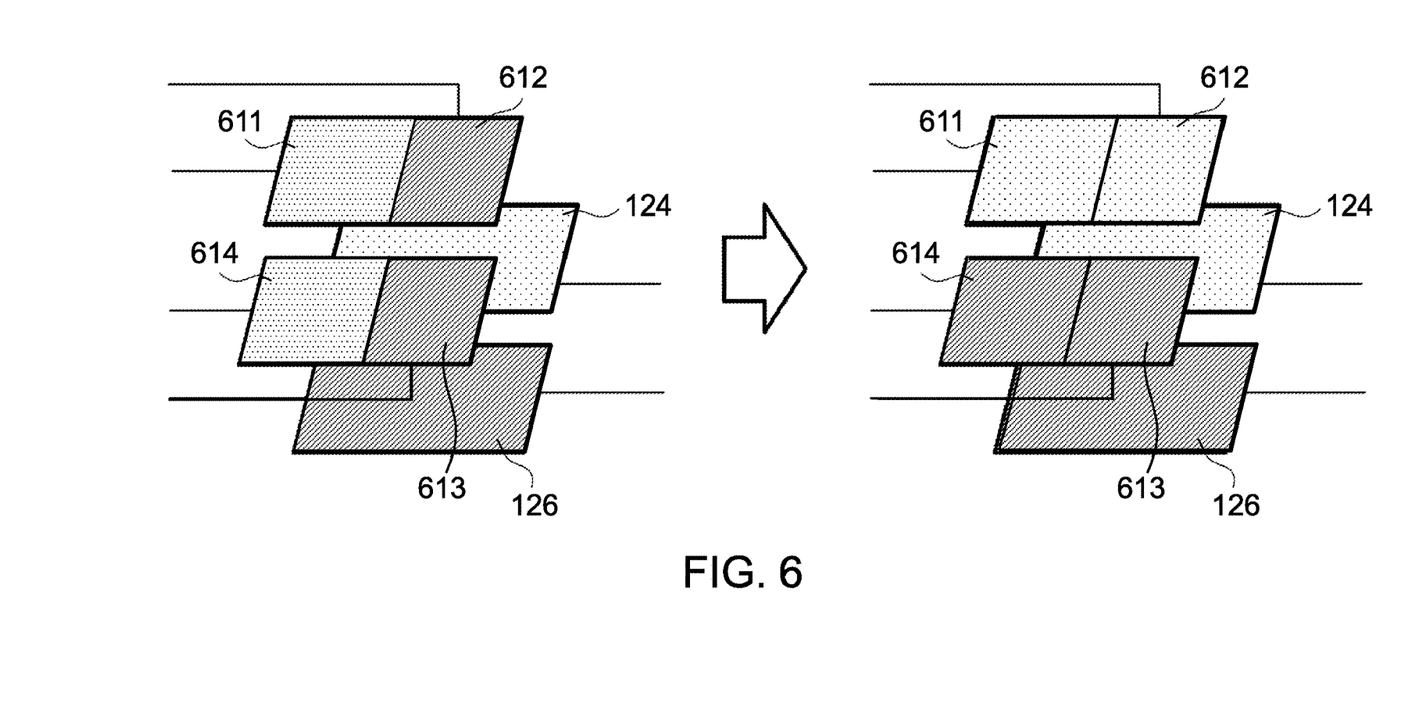
FIG. 6 is a schematic diagram of a configuration of electrodes of a data reading device according to an embodiment of the present invention.

FIG. 6 shows a schematic diagram of a configuration of electrodes of a data reading device according to an embodiment of the present invention. As shown, the electrodes of the data reading device are consisted of four electrodes, which are an electrode 611, an electrode 612, an electrode 613 and an electrode 614, connected to the control circuit 112. The control circuit 112 is capable of individually controlling the voltage of the electrodes. Referring to the left side of FIG. 6, the control circuit 112 initially provides the electrode 611 and the electrode 614 with the same voltage signal, so that the two operate to form a larger electrode. The same applies to the electrode 612 and the electrode 613. However, with the above configuration directions of the electrodes, an effective capacitor may hardly be formed with the electrodes of the data transmission device. Therefore, when the data transmission process reaches a predetermined electrode adjustment period and the determination unit 111 of the data reading device remains incapable of retrieving meaningful data, the control circuit 112 may dynamically adjust the configuration directions of the electrodes according to the determination result of the determination unit 111 in real-time. For example, the electrode 611 is grouped with the electrode 612 and the electrode 613 is grouped with the electrode 614 to form the diagram at the right side of FIG. 6.

Figure 7:
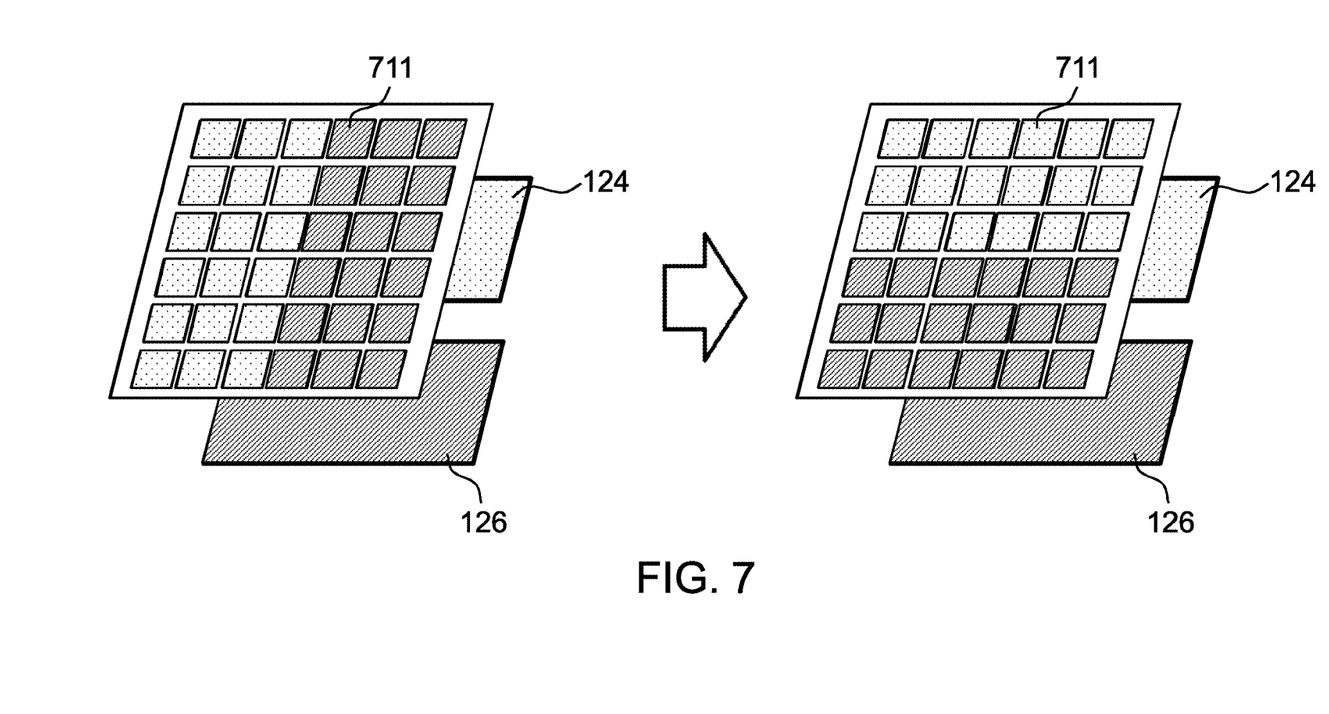
FIG. 7 is a schematic diagram of a configuration of electrodes of a data reading device according to another embodiment of the present invention.

FIG. 7 shows a schematic diagram of a configuration of electrodes of a data reading device according to another embodiment of the present invention. As shown, the electrodes of the data reading device are consisted of multiple smaller electrodes 711, each connected to the control circuit 112. The control circuit 112 may divide the small electrodes 711 into two larger parts, with the first part providing a voltage (represented by a lighter shade) and the second part providing different voltages (represented by a darker shade). As such, the configuration directions of the electrodes can be adjusted through adjusting the voltages at the different small electrodes 711. The number of the first part of small electrodes 711 may be different from that of the second part of small electrodes 711. Thus, in addition to changing the configuration directions of the electrodes, areas of the electrodes may be further adjusted to increase operation flexibilities.

It should be noted that, the present invention is directly applicable to an electronic device with a touch panel. In fact, each of the small electrodes 711 in FIG. 7 is equivalent to one sensing electrode of a touch panel, and each sensing electrode is originally connected to a circuit equivalent to the control circuit 112. By closely arranging the small electrodes on the touch panel into directional electrodes using the approach shown in FIG. 7, these electrodes may form coupling capacitances with the electrodes of the data transmission device. Further, in addition to serving as a data reading device, the electronic device with the touch panel may also serve as a data transmission device, provided that potentials of the electrodes are controlled to form switch elements that connect two electrodes (or multiple small electrodes). Further, the present invention may be implemented to both self capacitive and mutual capacitive touch panels.

Figure 8:
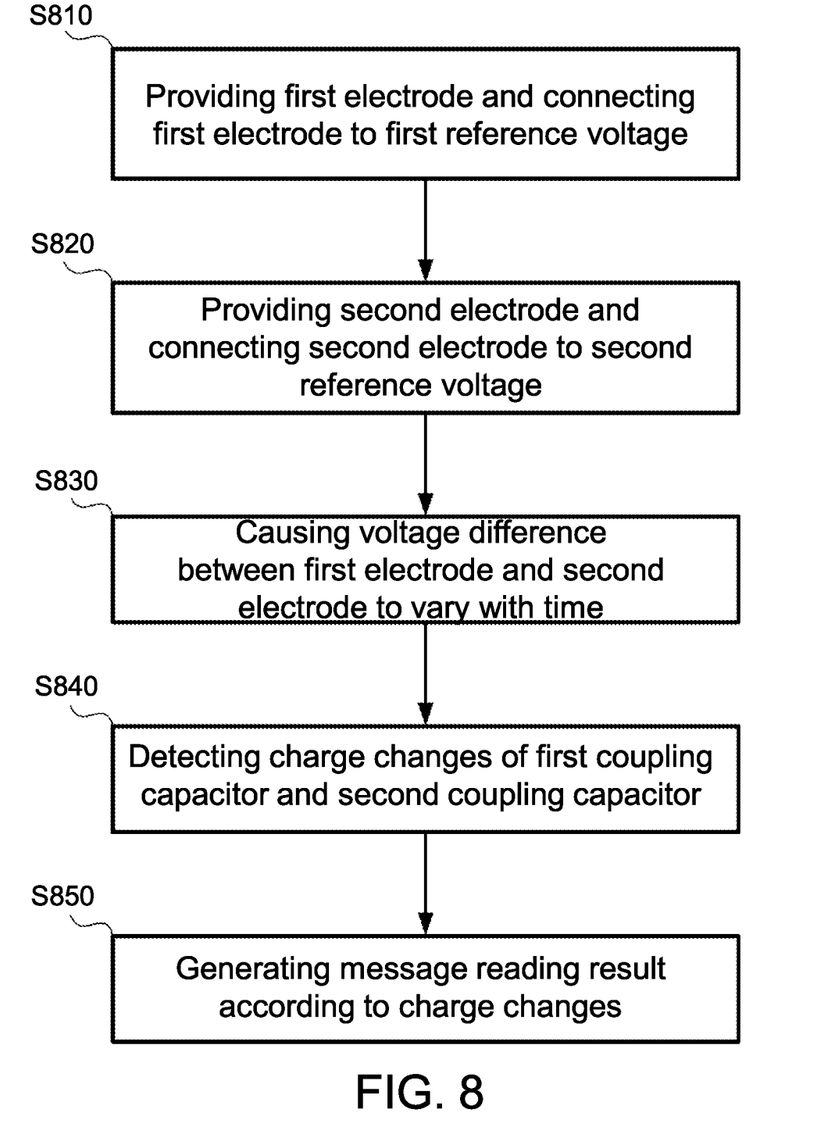
FIG. 8 is a flowchart of a data reading method according to an embodiment of the present invention.

FIG. 8 shows a flowchart of a data reading method according to an embodiment of the present invention. Apart from the foregoing data reading device, the present invention correspondingly discloses a data reading method adapted to transmit power to a data reading device and receive data transmitted from the data reading device. The method may be implemented by the foregoing data reading device 210 or an equivalent device. As shown in FIG. 8, the data reading method according to an embodiment of the present invention includes following steps.

In step S810, a first electrode is provided, and the first electrode is connected to a first reference voltage. The first electrode may be one complete piece of metal plate or a conductive material. Alternatively, the first electrode may be formed by a plurality of adjacent but non-contact metal or conductive materials, e.g., a plurality of detection units of a capacitive touch panel, with each of the detection units being a transparent conductive material.

In step S820, a second electrode is provided, and the second electrode is connected to a second reference electrode. The method for forming the second electrode is the same as that of the first electrode. The first electrode and the second electrode form a first coupling capacitance and a second coupling capacitance with the data transmission device, respectively. Power on the first electrode and the second electrode may be transmitted to the data transmission device via capacitance coupling. Thus, the data transmission device is operable even without an active power source (e.g., a battery).

In step S830, a voltage difference between the first electrode and the second electrode is caused to vary with time. In order to accumulate charges on the first coupling capacitance and the second coupling capacitance, a voltage difference is caused between the first electrode and the second electrode, and is caused to change periodically. For example, the voltage difference repeatedly changes between a first difference and a second difference.

In step S840, changes in the charges of the first coupling capacitance and the second coupling capacitance are detected. When the data transmission device transmits data, the capacitance values of the equivalent capacitors formed by the first coupling capacitance and the second coupling capacitance are caused to change, which indirectly leads to changes in the charges accumulated on the first coupling capacitance and the second coupling capacitance. Therefore, through detecting the charge changes of the first coupling capacitance and the second coupling capacitance, the data transmitted from the data transmission device can be learned.

In step S850, a data reading result is generated according to the charge changes. The charge changes reflect the data transmitted from the data transmission device. For example, the data transmitted represents a logic signal 1 when the period in which the amount of charges is lower for over a predetermined period, or else the data represents a logic signal 0. Multiple logic signals may then compile into meaningful data.

More specifically, when step S810 and step S820 utilize a capacitive touch panel as electrodes, the first part of the detection units of the touch panel serves as the first electrode and the second part serves as the second electrode. Further, areas of the first part and the second part may be dynamically adjusted according to the data reading result of step S850 to further change configuration directions and/or areas of the electrodes to enhance the capacitance coupling efficiency.

Figure 9:
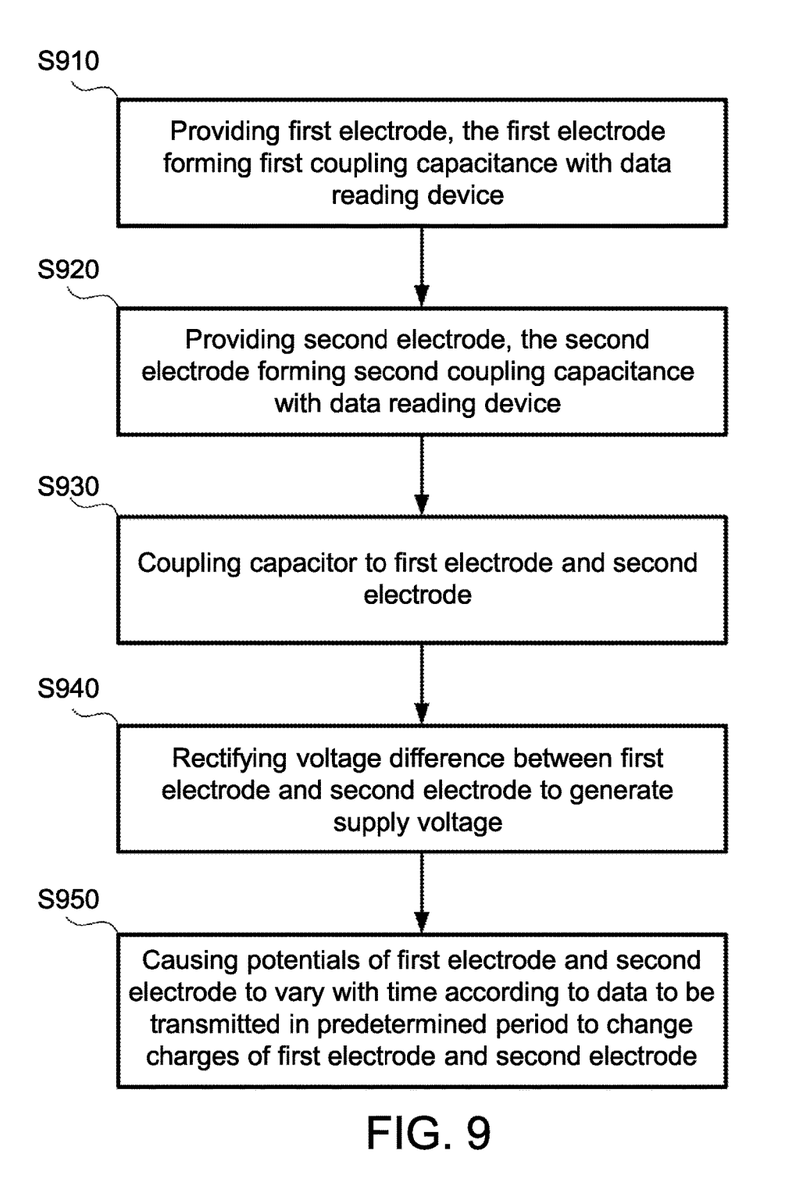
FIG. 9 is a flowchart of a data transmission method according to an embodiment of the present invention.

FIG. 9 shows a flowchart of a data transmission method according to an embodiment of the present invention. Apart from the data transmission device, the present invention further discloses a data transmission method adapted to receive power from a data reading device and transmit data. The method may be implemented by the foregoing data transmission device 220 or an equivalent device. As shown in FIG. 9, the data transmission method according to an embodiment of the present invention includes following steps.

In step S910, a first electrode is provided, and a first coupling capacitance is formed by the first electrode and the data reading device. The first electrode may be one complete piece of metal plate or a conductive material. Alternatively, the first electrode may be formed by a plurality of adjacent but non-contact metal or conductive materials, e.g., a plurality of detection units of a capacitive touch panel, with each of the detection units being a transparent conductive material.

In step S920, a second electrode is provided, and a second coupling capacitance is formed by the second electrode and the data reading device. The method for forming the second electrode is the same as that of the first electrode.

In step S930, a capacitor is used to couple the first electrode and the second electrode. This capacitor is connected in series with the first electrode and the second electrode, and has an equivalent capacitance value smaller than those of the first coupling capacitance and the second coupling capacitance after being connected in series based on characteristics of capacitors connected in series. Further, this capacitor may be a parasitic capacitor between the first electrode and the second electrode, or an additionally provided capacitor.

In step S940, a voltage difference between the first electrode and the second electrode is rectified to generate a supply voltage. This step may convert the voltage difference between the first electrode and the second electrode by a rectifier to form a direct current voltage as a power source.

In step S950, according data to be transmitted, potentials of the first electrode and the second electrode are caused to change in a predetermined period to change charges of the first electrode and the second electrode. When the potentials of the first electrode and the second electrode are changed, e.g., when the two are connected to each other or when the two are connected to a same potential, it is equivalently bypassing the capacitor provided by step S930 in a way that the first coupling capacitance and the second capacitor are directly connected in series. As a result, the equivalent capacitance values of the first coupling capacitance and the second coupling capacitance are changed to further change the charges on the first electrode and the second electrode. Through detecting the charge changes on the equivalent capacitors, the data reading device may learn the data transmitted.

One person skilled in the art can understand details and possible implementation variations of the methods in FIG. 8 and FIG. 9 according to the disclosure of the devices in FIG. 1 to FIG. 7. Without affecting the full disclosure and possible implementation, such repeated description is omitted herein. Further, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although a capacitive touch panel is taken as an example in the foregoing embodiments, based on the disclosure of the present invention, one person skilled in the art may appropriately apply the present invention to other electronic devices capable of providing electrodes.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data reading device, configured to read data transmitted from a data transmission device, the data reading device comprising:
a first electrode, forming a first coupling capacitance with the data transmission device;
a second electrode, forming a second coupling capacitance with the data transmission device; and
a control circuit, configured to provide the first electrode with a first reference voltage and the second electrode with a second reference voltage, and to detect charge changes of the first coupling capacitance and the second coupling capacitance,
wherein the data reading device determines the data according to the charge changes,
wherein the data reading device comprises a capacitive touch panel comprising a plurality of detection units, the first electrode comprises a first part of the detection units, and the second electrode comprises a second part of the detection units, and the first electrode and the second electrode are configured for self-capacitive touch sensing or mutual capacitive touch sensing, and
wherein the data transmission device comprises another capacitive touch panel that forms the first coupling capacitance and the second coupling capacitance with the first electrode and the second electrode, respectively.

2. The data reading device according to claim 1, wherein the control circuit renders a voltage difference between the first electrode and the second electrode to vary with time.

3. The data reading device according to claim 1, wherein the first electrode and the second electrode are in the same plane.

4. The data reading device according to claim 1, wherein the control circuit dynamically determines a configuration direction or area of the first part and the second part according to a data reading result.

5. A data transmission device, configured to transmit data to a data reading device, the data transmission device comprising:
a first electrode, forming a first coupling capacitance with the data reading device;
a second electrode, forming a second coupling capacitance with the data reading device;
a rectifier, coupled to the first electrode and the second electrode, configured to generate a voltage according to a voltage difference between the first electrode and the second electrode;
a switch element, coupled between the first electrode and the second electrode;
a control circuit, coupled to the rectifier and the switch element, that receives the voltage and controls an on or off status of the switch element to change charges of the first electrode and the second electrode; and
a capacitor, coupled between the first electrode and the second electrode, configured to connect the first coupling capacitance and the second coupling capacitance in series, wherein the data transmission device comprises a capacitive touch panel that comprises a plurality of detection units, the first electrode comprises a first part of the detection units, and the second electrode comprises a second part of the detection units, and the data reading device receives the data through detecting the charge changes, and the first electrode and the second electrode are configured for self-capacitive touch sensing or mutual capacitive touch sensing, and wherein the data reading device comprises another capacitive touch panel that forms the first coupling capacitance and the second coupling capacitance with the first electrode and the second electrode, respectively.

6. A data reading method, applied to a data reading device, for reading data transmitted from a data transmission device, the data reading method comprising:

providing a first reference voltage to a first electrode of the data reading device and providing a second reference voltage to a second electrode of the data reading device, the first electrode forming a first coupling capacitance with the data transmission device, the second electrode forming a second coupling capacitance with the data transmission device;

detecting charge changes of the first coupling capacitance and the second coupling capacitance; and generating a data reading result according to the charge changes, the method being applied to a capacitive touch panel, the capacitive touch panel comprising a plurality of detection units, wherein providing the first reference voltage to the first electrode comprises selecting a first part of the detection units to form the first electrode, and providing the second reference voltage to the second electrode comprises selecting a second part of the detection units to form the second electrode, wherein the first electrode and the second electrode are configured for self-capacitive touch sensing or mutual capacitive touch sensing, and wherein the data transmission device comprises another capacitive touch panel that forms the first coupling capacitance and the second coupling capacitance with the first electrode and the second electrode, respectively.

7. The data reading method according to claim 6, wherein a voltage difference between the first electrode and the second electrode varies with time.

8. The data reading method according to claim 6, further comprising: dynamically determining a configuration direction or area of the first part and the second part according to the data reading result.

9. A data transmission method, applied to a data transmission device, for transmitting data to a data reading device, the data transmission method comprising:

forming a first coupling capacitance between a first electrode of the data transmission device and the data reading device;

forming a second coupling capacitance between a second electrode of the data transmission device and the data reading device; and providing a capacitor, the capacitor being coupled between the first electrode and the second electrode, and configured to connect the first coupling capacitance and the second coupling capacitance in series, the method applied to a capacitive touch panel, the capacitive touch panel comprising a plurality of detection units, wherein forming the first coupling capacitance comprises selecting a first part of the detection units to form the first electrode, and forming the second coupling capacitance comprises selecting a second part of the detection units to form the second electrode, and the data reading device receives the data through detecting charge changes, wherein the first electrode and the second electrode are configured for self-capacitive touch sensing or mutual capacitive touch sensing, wherein the data reading device comprises another capacitive touch panel that forms the first coupling capacitance and the second coupling capacitance with the first electrode and the second electrode, respectively.

10. The data transmission method according to claim 9, further comprising:

rectifying a voltage difference between the first electrode and the second electrode to generate a voltage.

11. The data transmission method according to claim 9, wherein potentials of the first electrode and the second electrode vary in a predetermined period according to the data to change charges of the first electrode and the second electrode.

* * * * *